United States Patent [19]

Toothill et al.

[11] 4,374,947
[45] Feb. 22, 1983

[54] METHOD FOR THE THERMAL STABILIZATION OF SULFUR-VULCANIZABLE ELASTOMERS OF THIODIETHANOL

[75] Inventors: Richard B. Toothill, Warren; Romeo R. Aloia, Bridgewater, both of N.J.

[73] Assignee: American Cyanamid Company, Stamford, Conn.

[21] Appl. No.: 381,496

[22] Filed: May 24, 1982

Related U.S. Application Data

[63] Continuation-in-part of Ser. No. 28,016, Apr. 6, 1979, abandoned.

[51] Int. Cl.³ .......................... C08K 5/09; C08K 3/32; C08K 3/30; C08K 3/26; C08K 3/22
[52] U.S. Cl. .................................. 524/398; 524/396; 524/397; 524/413
[58] Field of Search ............... 524/396, 397, 398, 413, 524/595, 609; 528/373

[56] References Cited

U.S. PATENT DOCUMENTS 4,094,859  6/1978  Chang ................................ 528/373

Primary Examiner—V. P. Hoke

[57] ABSTRACT

A method of improving the thermal stability of sulfur-vulcanizable elastomers by incorporating copper salts therein, is disclosed.

9 Claims, No Drawings

METHOD FOR THE THERMAL STABILIZATION OF SULFUR-VULCANIZABLE ELASTOMERS OF THIODIETHANOL

CROSS-REFERENCE TO RELATED APPLICATION

This application is a continuation-in-part of our copending application, Ser. No. 28,016, filed Apr. 6, 1979 and entitled Method for the Thermal Stabilization of Sulfur-Vulcanizable Elastomers of Thiodiethanol which is now abandoned.

BACKGROUND OF THE INVENTION

Sulfur-vulcanizable elastomers based on the condensation of thiodiethanol with one or more aliphatic diols, and containing a sulfur-vulcanizable double bond, are described by Aloia, U.S. Pat. No. 3,951,927; Chang et al, U.S. Pat. No. 3,985,708; Chang, U.S. Pat. No. 4,000,213; and Li et al, U.S. Pat. No. 4,028,305, which patents are incorporated herein by reference. These elastomers may be represented by the Formula (I):

wherein $+OG+$ comprises a copolymer of randomly alternating structural units selected from:
(A) structural units (II) and (III)

wherein R represents one or more radicals remaining on removal of two hydroxyl groups from (a) aliphatic saturated linear, branched chain or cyclic diols, or (b) aliphatic linear, branched chain or cyclic diols containing external unsaturation and having an allylic hydrogen atom; and
(B) structural units (II), above, (III), above, and (IV)

wherein R' represents the radical remaining on removal of two hydroxyl groups from a diphenolic compound; said copolymers comprising structural units (A) and (B) being characterized in that:
(1) n is an integer sufficient to provide in said copolymer a molecular weight of at least about 8000;
(2) the molar ratio of (II) to (III) when said copolymer comprises structural units (A), or the molar ratio of (II) to the total of (III) and (IV) when said copolymer comprises structural units (B), is not less than about 1:1; and
(3) the polymers contain from about 1 to 10 mole percent of said diol (b), based on the total of all units (II), (III) and (IV) present in said copolymer.

Exemplary of such copolymers are those comprising at least 50-mole percent of thiodiethanol, 40-49 mole percent of one or more saturated aliphatic diols, e.g., diethylene glycol, and 1 to 10 mole percent of an unsaturated aliphatic diol, e.g., trimethylol propane monoallyl ether.

The thiodiethanol-based elastomers are readily vulcanized with sulfur in a non-zinc oxide containing formulation. The preferred vulcanization systems include a mixture of sulfur and a decahydropyrazine[2,3-b]pyrazine compound, as described by Maulding and Behrens in copending application, Ser. No. 017,655, filed about Mar. 5, 1979, now U.S. Pat. No. 4,202,963, and a mixture of sulfur and a polyethylene amine compound, as described by Behrens in copending application, Ser. No. 017,656, filed about Mar. 5, 1979, now U.S. Pat. No. 4,218,559 both of which are incorporated herein by reference thereto.

The elastomers, prepared as described, and vulcanized with sulfur, exhibit outstanding properties. However, the vulcanized elastomers are not as thermally stable as desired, i.e., they suffer loss of properties (tensile strength, elongation) on aging at elevated temperatures. One of the most serious disadvantages of the thermal instability is manifested by high compression-set properties.

SUMMARY OF THE INVENTION

The present invention is based on the discovery that copper salts, when incorporated into thiodiethanol-based elastomers, surprisingly provide substantially improved resistance to thermal degradation on aging, especially in providing greatly improved compression-set properties.

DESCRIPTION OF THE INVENTION INCLUDING PREFERRED EMBODIMENTS

The method of the present invention comprises incorporating a copper salt, or mixtures of copper salts, into thiodiethanol-based elastomers in thermal stabilizing amounts. Generally, it has been found that amounts ranging from about 0.05 to 10 parts, by weight, per hundred parts by weight of the elastomer, preferably about 0.2 to 7.0 parts, per hundred of elastomer, should be employed.

Any copper salt can be used to provide enhanced resistance to thermal aging to the elastomers. The most useful salts include both cuprous and cupric salts and preferably cuprous salts are used. Cuprous chloride has been found to be especially beneficial. Exemplary copper salts include cuprous chloride, cuprous bromide, cuprous oxide, cuprous sulfide, cuprous thiocyanate, cupric phosphate, cupric formate, cupric sulfide, cupric carbonate, cupric stearate, cupric hydroxide, cupric octoate, cupric naphthenate, cupric acetyl acetonate, and the like.

The method by which the copper salts are added to the elastomer is not critical, however, it has been found beneficial to first prepare the thiodiethanol-based elastomers by condensing thiodiethanol, or a mixture of a major proportion of thiodiethanol with one or more aliphatic diols, including about 1 to 10 mole percent of an unsaturated diol, optionally with a dihydroxy phenolic compound, in the presence of an acidic dehydrating catalyst, preferably phosphorous acid, at a temperature of about 150° to 200° C. until a low-molecular-weight, hydroxyl-terminated polymer is obtained. To this low-molecular-weight polymer is then added an additional catalyst, e.g., sulfuric acid, and the condensation reaction is continued at 175°–200° C. under vacuum in a high-shear mixer, until the molecular weight exceeds about 8000, and a gum is obtained. The copper salt is then added to the elastomer following this build-up of its molecular weight to the gum stage. The copper salt may be added as a powder and mixed into the gum in any convenient manner. Thus, it may be mixed into the gum using a high-shear mixer, a dough (or sigma) mixer, on a rubber mill or in a Banbury mixer. Preferably, the copper salt is added to an elevated temperature in order to insure uniform distribution and solubility in the gum. Any temperature above about 50° C. up to the condensation temperature is useful, although it is preferable to add the salt at a temperature above 100° C. If the copper salt is added to the polymer prior to attaining a high-molecular-weight gum, it may interfere with the condensation reaction with the result that a gum is either not readily obtained or the rate of reaction is significantly slowed.

The gum, containing the copper salt, is then compounded in the same manner as conventional elastomers using standard rubber compounding techniques and cured in the conventional manner, preferably using one of the sulfur vulcanization systems described hereinabove. The effects of aging at elevated temperature are determined by exposing the vulcanized elastomer in air at 150° C. for a period of 70 hours, and then determining the percent retention of the original tensile strength and elongation. Another measure of resistance to aging is compression set, determined after aging for 70 hours at 150° C.

EXAMPLE A

Preparation of Elastomer Gum

A mixture of thiodiethanol (85-mole percent), diethylene glycol (10-mole percent), and trimethylol propane monoallyl ether (5-mole percent) was condensed in the presence of 0.25 percent, by weight, of phosphorous acid at about 190° C. until a hydroxyl-terminated macroglycol, having a molecular weight of about 2000, was obtained. To this was added 0.04 percent, by weight, of sulfuric acid and the mixture was transferred to an high-shear mixer. The condensation reaction was continued under high-shear mixing at about 190° C./≦5 mm until a high-molecular-weight gum (m.w. 8200) was obtained.

The following examples are set forth by way of illustration only and are to be construed as limitations on the present invention except as set forth in the appended claims. All parts and percentages are by weight unless otherwise specified.

In the examples, the various copper salts, which are incorporated into the gum of Example A, were added during the final stages of gum preparation, in the percentages indicated (based on the weight of gum), and mixed in using a high-shear mixer.

EXAMPLE 1

A portion of the elastomer of Example A (100 parts) to which was added 0.5 part of cuprous chloride is compounded with 50 parts of carbon black, 5 parts of calcium oxide, one part of sulfur, 2 parts of triethylene tetramine stearate, and one part of decahydropyrazino[2,3-b]pyrazine. The compounded elastomer is cured for 30 minutes at 176° C., then post-cured for 16 hours at 120° C. in an air oven. Separate specimens are air-fogged for 70 hours at 150° C. and compared to the elastomer containing no copper salt. The following properties are obtained:

|  | Control (no CuCl) | | | 0.5% CuCl | | |
| --- | --- | --- | --- | --- | --- | --- |
|  | Original | Aged | % Retention | Original | Aged | % Retention |
| Tensile, psi | 1525 | 790 | 52 | 1500 | 1310 | 88 |
| Elongation, % | 260 | 90 | 35 | 275 | 150 | 55 |
| Compression Set, % (70 hrs @ 150° C.) | — | 80 | — | — | 55 | — |

The data illustrate that cuprous chloride retards deterioration of the elastomer on aging, as evidenced by a high retention of tensile and elongation properties and reduced compression set compared with the control containing no cuprous chloride.

EXAMPLES 2-4

To portions of the elastomer of Example A (100 parts), are added the following copper salts: (2) cuprous bromide—0.725 part, (3) cuprous sulfide—0.4 part, and (4) cuprous thiocyanate—1.0 part, by compounding in the manner of Example 1. Compression set properties, determined after exposure for 70 hours at 150° C., are as follows:

|  | Compression Set, % |
| --- | --- |
| Control | 80 |
| Example 2 | 51 |
| Example 3 | 45 |
| Example 4 | 54 |

The data illustrate that a marked improvement in compression set is attained by incorporation of the copper salts into the elastomer.

EXAMPLE 5-13

The procedure of Examples 2-4 is followed with the following results:

| | | | % Retention | | |
| --- | --- | --- | --- | --- | --- |
| Example | Copper Salt | % | Tensile | Elongation | Compression Set % |
| 5 | cupric phosphate | 0.63 | 65 | 40 | 65 |
| 6 | cupric formate | 0.8 | 72 | 30 | 67 |
| 7 | cupric hydroxide | 0.485 | 75 | 42 | 65 |
| 8 | cupric sulfide | 0.5 | 57 | 50 | 64 |
| 9 | cupric carbonate | 1.77 | 64 | 63 | 73 |
| 10 | cupric octoate | 1.77 | 54 | 55 | 69 |
| 11 | cupric naphthenate | 5.0 | 52 | 51 | 69 |
| 12 | copper acetyl acetonate | 1.3 | 67 | 45 | 61 |
| 13 | cupric stearate | 0.5 | 80 | 46 | — |
| Control | — | — | 52 | 35 | 80 |

EXAMPLES 14-21

When the procedure of Example 1 is again followed except that the copper salt employed is (14) cuprous phosphate, (15) cuprous stearate, (16) cuprous oxide, (17) cupric bromide, (18) cupric sulfate, (19) cupric acetate monohydrate, (20) cupric oxide and (21) cupric nitrate substantially equivalent results are achieved.

We claim:

1. A method for improving the thermal stability of a vulcanizable elastomer of thiodiethanol which is not thermally stable which comprises incorporating therein a thermal stabilizing amount of a copper salt selected from the group consisting of cuprous chloride, cuprous bromide, cuprous sulfide, cuprous thiocyanate, cupric phosphate, cupric hydroxide, cupric sulfide, cupric carbonate and cupric salts of $C_1$–$C_{18}$ monocarboxylic acids, said elastomer of thiodiethanol being represented by the formula:

$$H{+}OG{+}_nOH \qquad (I)$$

wherein $+OG+$ comprises a copolymer of randomly alternating structural units selected from:

(A) structural units (II) and (III)

$$+OC_2H_4SC_2H_4+ \qquad (II)$$

$$+OR+ \qquad (III)$$

wherein R represents one or more radicals remaining on removal of two hydroxyl groups from (a) aliphatic saturated linear, branched chain or cyclic diols, or (b) aliphatic linear, branched chain or cyclic diols containg external unsaturation and having an allylic hydrogen atom; and (B) structural units (II), (III) and (IV)

$$+OR+ \qquad (IV)$$

wherein R' represents the radical remaining on removal of two hydroxyl groups from a diphenolic compound; said copolymer comprising structural units (A) and (B) being characterized in that (1) n is an integer sufficient to provide in said copolymer a molecular weight of at least about 8000; (2) the molar ratio of structural units (II) to (III), when the polymer comprises structural units (A), or the molar ratio of structural units (II) to the total of (III) and (IV), when the polymer comprises structural units (B), is not less than about 1:1; and (3) the polymers contain from 1 to 10 mole percent of said diol (b), based on the total of all units (II), (III) and (IV) present in said polymer.

2. The method of claim 1 wherein said copper salt is cuprous chloride.

3. The method of claim 1 wherein said polymer of thiodiethanol comprises at least 50 mole percent of thiodiethanol and 1 to 10 mole percent of trimethylol propane monoallyl ether.

4. The method of claim 1 wherein said polymer comprises 70 to 85 mole percent thiodiethanol, 5 to 29 mole percent of one or more saturated aliphatic diols, and 1 to 10 mole percent of trimethylol propane monoallyl ether.

5. The method of claim 1 wherein said copper salt is cuprous sulfide.

6. The method of claim 1 wherein said copper salt is cupric carbonate.

7. The method of claim 1 wherein said copper salt is cupric stearate.

8. The method of claim 1 wherein said copper salt is cupric octoate.

9. The method of claim 3 wherein said polymer additionally contains from 40 to 49 percent of one or more saturated aliphatic glycols.

* * * * *